Figure 11:
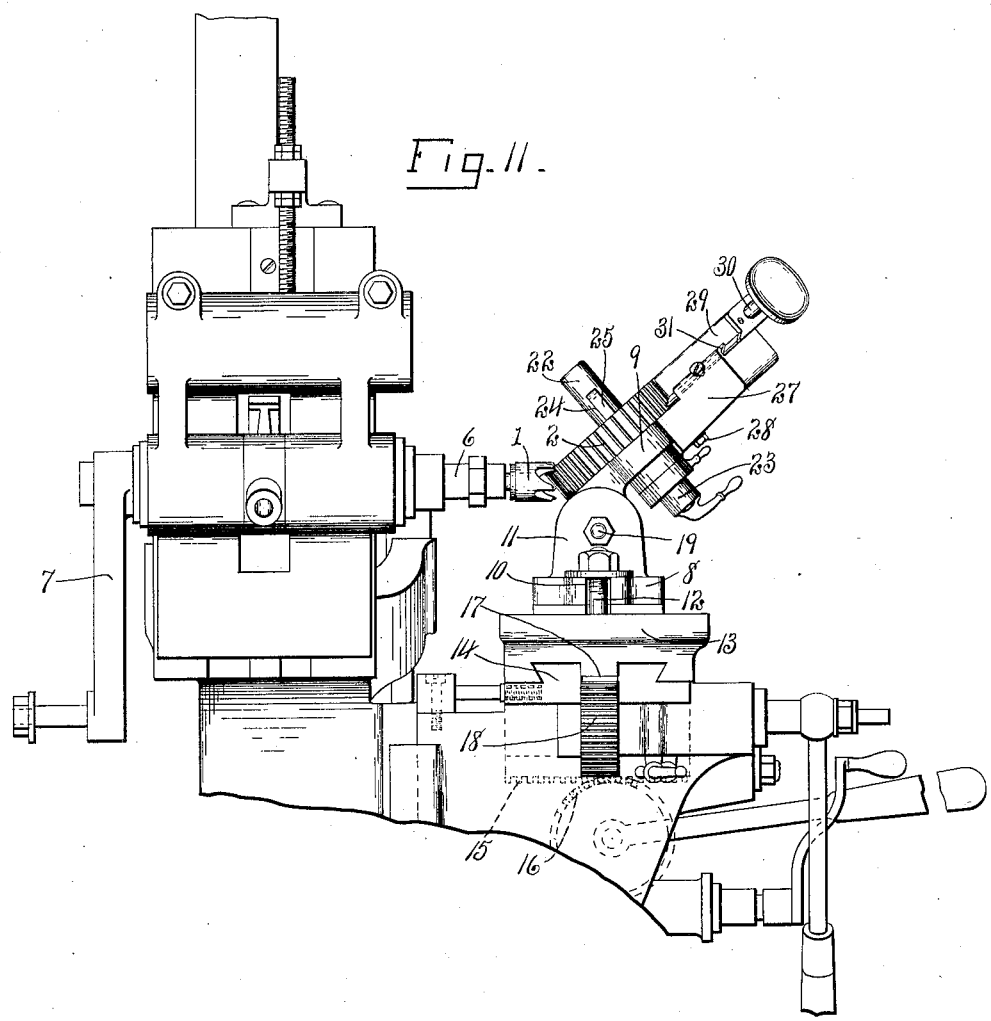

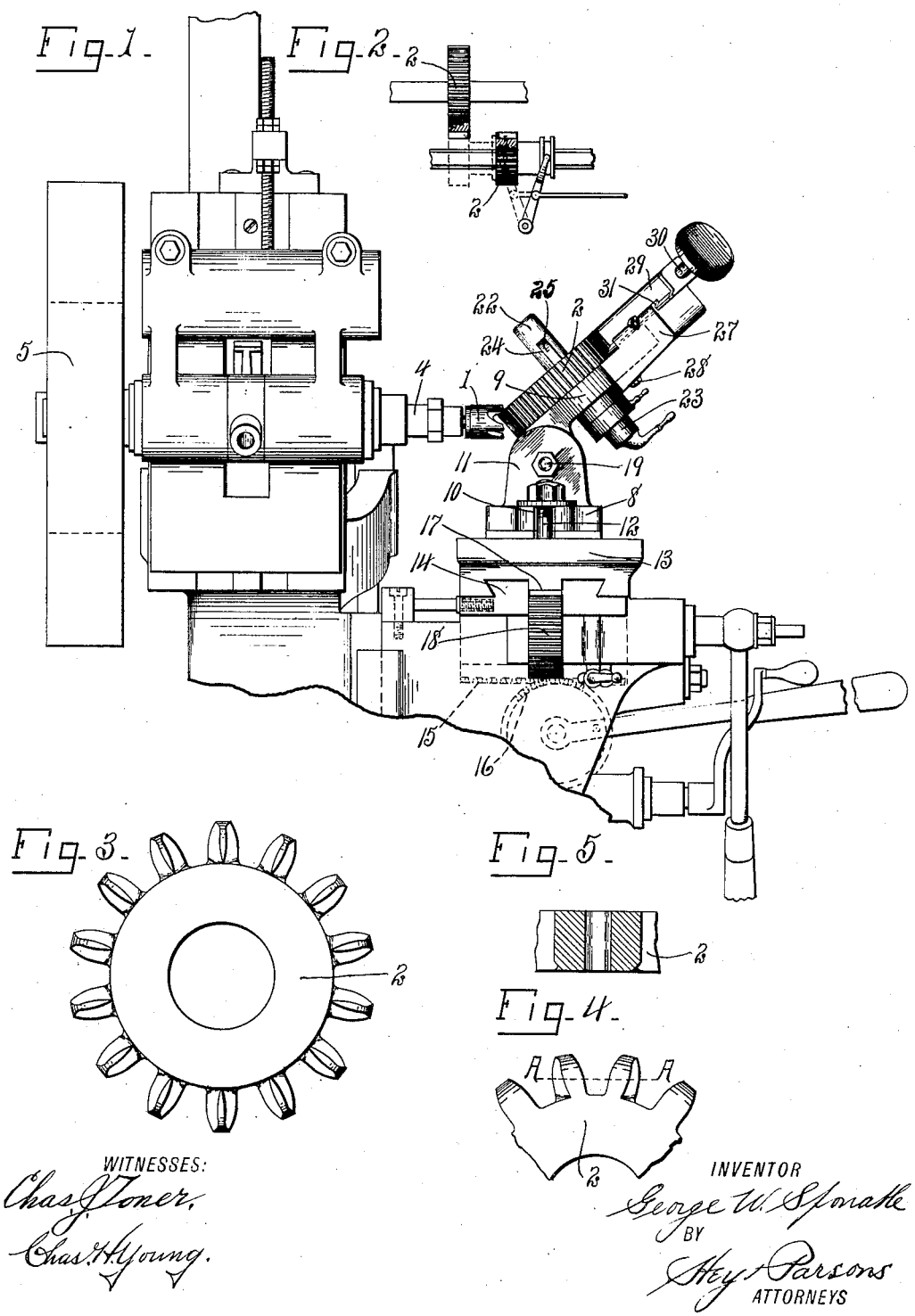

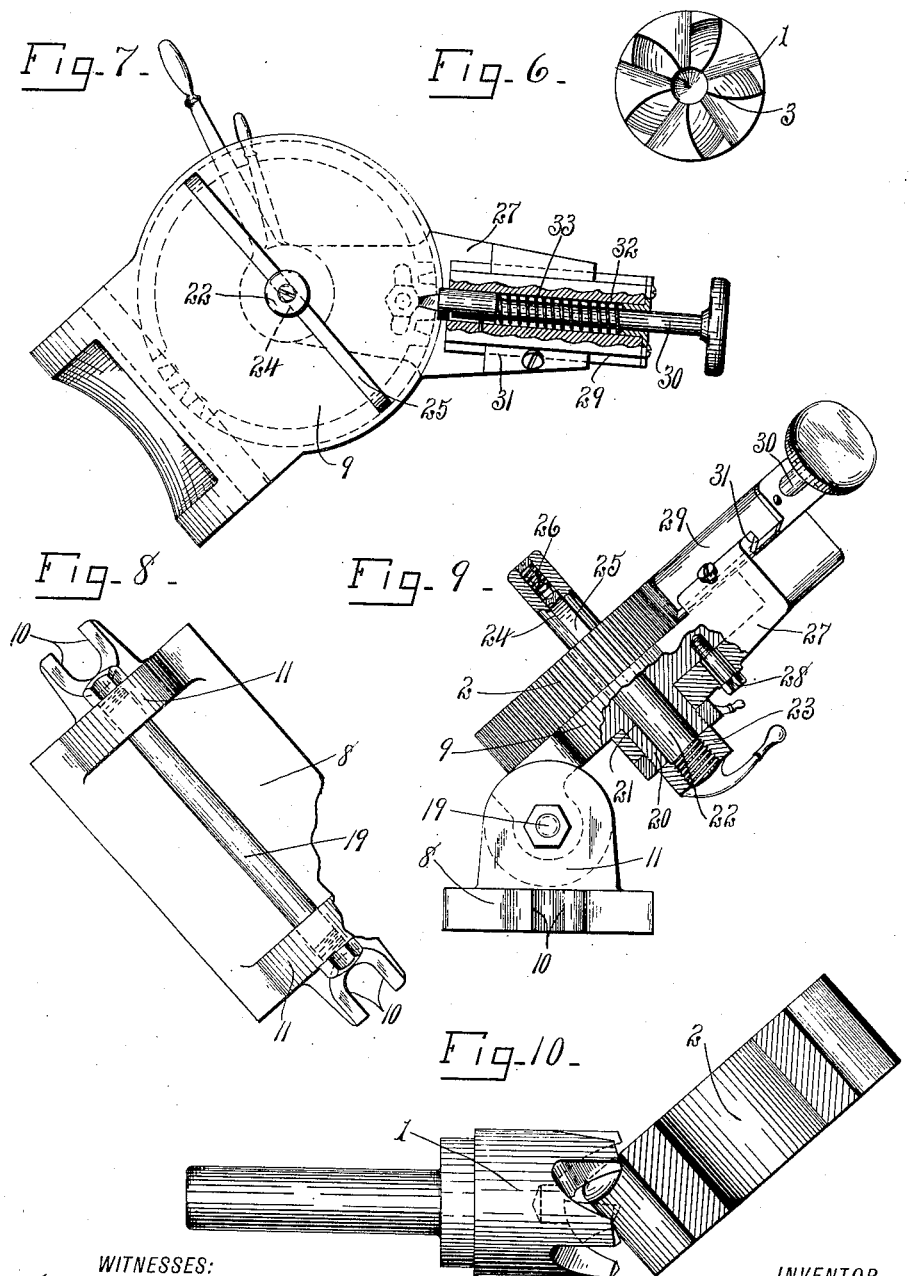

G. W. SPONABLE.
APPARATUS FOR FORMING THE ENDS OF GEAR TEETH.
APPLICATION FILED APR. 11, 1906. RENEWED SEPT. 6, 1910.

1,110,274.

Patented Sept. 8, 1914.

3 SHEETS—SHEET 3.

WITNESSES:

INVENTOR

BY

ATTORNEYS

UNITED STATES PATENT OFFICE.

GEORGE W. SPONABLE, OF SYRACUSE, NEW YORK, ASSIGNOR TO THE BROWN-LIPE GEAR COMPANY, OF SYRACUSE, NEW YORK, A CORPORATION OF NEW YORK.

APPARATUS FOR FORMING THE ENDS OF GEAR-TEETH.

1,110,274.     Specification of Letters Patent.     Patented Sept. 8, 1914.

Application filed April 11, 1906, Serial No. 311,019. Renewed September 6, 1910. Serial No. 580,629.

*To all whom it may concern:*

Be it known that I, GEORGE W. SPONABLE, of Syracuse, in the county of Onondaga and State of New York, have invented a certain new and useful Apparatus for Forming the Ends of Gear-Teeth, of which the following is a specification.

My invention relates to machines for forming the ends of gear-teeth, and has for its object the production of an apparatus for the desired purpose which is particularly simple in construction and highly effective in use; and to this end, it consists in the combinations and constructions hereinafter set forth and claimed.

In describing this invention, reference is had to the accompanying drawing in which like characters designate corresponding part in all the views.

Figure 1 is an elevation of a portion of a machine constituting one embodiment of my invention, a gear being shown as secured upon the support. Fig. 2 is a plan, partly in section, of portions of a pair of shafts, gears mounted respectively on the shafts, and having their teeth provided with diverging end surfaces, and means for shifting one of the gears axially into and out of engagement with the other. Fig. 3 is a face view of a gear having ends of its teeth formed by my machine. Fig. 4 is a face view of a part of a gear having the opposite portions of two of its teeth provided with diverging end surfaces. Fig. 5 is a sectional view on line A—A, Fig. 4. Fig. 6 is an end view of one embodiment of the cutting tool of my machine. Fig. 7 is a plan, partly in section, of a portion of one construction of the support for the gear, and the means for alining the gear relatively to the tool, said gear being indicated by dotted lines. Fig. 8 is a plan, partly broken away, of the base of the support illustrated in Figs. 1 and 7. Fig. 9 is an elevation, partly in section, of said support, a gear secured thereto, and the means for alining the gear relatively to the cutting tool. Fig. 10 is an elevation, partly in section, of the tool seen in Figs. 1 and 6, and the gear engaged by said tool. Fig. 11 is an elevation, partly broken away, of a modified construction of apparatus embodying my invention.

1 is a tool, particularly applicable for use with the remaining parts of my machine. The tool 1 is arranged with its axis at an oblique angle to the axis and to the planes of the side and end faces of the gear 2, and has internal cutting means, as sharpened teeth or edges movable about the axis of the tool in an arc of a circle inclosing a plurality of teeth of the gear 2, said tool being usually formed with a recess 3 in its end which receives portions of a plurality of teeth of the gear. The tool 1 preferably engages opposite portions of the ends of two teeth, Fig. 4, and thus simultaneously forms convex diverging end surfaces on said teeth. In the illustrated construction of my invention, the tool 1 engages opposite parts of two contiguous teeth, but it is obvious that said tool may be of greater diameter and may engage opposite portions of two teeth separated by one or more intervening teeth. The teeth operated upon by my invention are formed with convex end surfaces extending substantially in a radial direction and diverging toward the sides of the teeth, the convex surfaces of one portion of the end of one tooth and the opposite portion of the end of another tooth diverging from each other in substantially the same curved line. A gear having teeth provided with end surfaces of this construction forms the subject-matter of my pending application, Sr. No. 309,246, filed Apr. 2, 1906, and two gears the teeth of which are provided with such end surfaces and one of which is movable axially into and out of mesh with the other, (Fig. 2) will readily engage when the slidable gear is shifted. My invention is, however, not limited to a tool having internal cutting means, since a hollow mill may be utilized as the cutting tool of the machine.

The tool 1 may be suitably connected to a rotary shaft 4 driven by a wheel or pulley 5, Fig. 1, or if desired, it may be mounted on an oscillating shaft 6, Fig. 11, driven by a rocking crank 7. The means for actuating the tool 1 forms no part of my present invention, and further description thereof is deemed unnecessary.

My apparatus for forming the ends of the teeth of gears also includes a suitable support for a gear. The illustrated support comprises a base 8, a member 9 movably mounted on the base, and means for securing the gear to said member. The base 8, as shown, is formed with attaching means, as slotted ends 10, Fig. 8, and with upright parts 11 spaced apart. Said base 8 is clamped, by any desirable means, as bolts 12, coöperating with its slotted ends, to a table 13 preferably movable relatively to the tool 1 in a direction lengthwise of the axis of said tool and also in a direction at an angle thereto. In the illustrated embodiment of my invention, the table 13 is mounted on a carriage 14 which is provided with a rack 15 engaged by a toothed wheel 16, said parts 14, 15 and 16 operating to move the table 13 lengthwise of the axis of the tool, and said table is provided with a rack 17 coacting with a rotary wheel 18 for moving the table 13 in a direction at an angle to said axis. As the table 13 may obviously be supported and moved, as described, by any suitable means, further description of the devices for supporting and moving the same is deemed unnecessary. It will be understood, however, by those skilled in the art, that the adjustment of the table 13 at an angle to the axis of the tool 1 may be dispensed with, and also that the table 13 and the support for the gear 2 may be fixed from movement relatively to the tool 1, and that said tool may be moved axially, and if desired laterally, relatively to the support.

In the preferable construction of my invention, the member 9 rises at an angle from the base 8, and its lower end is fitted between the upright parts 11 and is connected thereto by a pivotal pin 19 which is arranged at an angle to the line of movement of the support for the gear and is provided with suitable nuts for clamping the opposing surfaces of the upright parts 11 against the lower end of the member 9, and preventing movement of said member on its pivotal pin. The member 9 is provided with a hub 20 and with an opening 21 extending through said member and its hub 20. A gear-support including the movable member 9 facilitates the adjustment of my machine for operation upon gears of different diameter, since said member 9 may be set at any desired angle. It is obvious, however, that the member 9 may be rigid with the base 8, especially when the machine is designed to operate upon gears of uniform diameter.

The means for securing the gear 2 to the member 9 is here shown as an arbor 22, and means coacting therewith. Said arbor is mounted in the opening 21 in the member 9, and its lower end projects beneath the end of the hub 20 and is threaded and provided with a nut 23 which bears against the end of the hub 20 and serves to move the arbor axially relatively to the member 9. The arbor 22 is adapted to enter the central opening of the gear to be secured to the member 9, and the periphery of the arbor forms a circular bearing for supporting the gear from lateral movement. It is apparent, however, that the upper face of the member 9 may be provided with a circular recess for receiving and fitting one end of the gear. The upper end of the arbor 22 extends above the contiguous face of the gear 2, and is provided with a slot 24 extending at substantially a right angle to the axis of the arbor for receiving a bar 25 which bears against one face of the gear 2. Said end of the arbor 22 is also provided with a longitudinally yielding part 26 which is movable into the slot 24 and engages one of the edges of the bar 25 and prevents endwise movement of said bar relatively to the arbor. When the gear 2 is mounted upon the member 9, the turning movement of the nut 23 in one direction serves to clamp the gear between the bar 25 and the opposing face of the support. The arbor 22 and the means, just described, coacting therewith form a particularly simple means for securing the gear to the member 9, but it is obvious that any other suitable means may be utilized for this purpose.

The means for alining the gear relatively to the tool 1 comprises a member 27, a clamping screw 28, a slide 29, and a plunger 30. The member 27 is journaled at one end on the hub 20, the periphery of the latter forming a bearing concentric with the circular bearing on the arbor 22 and with the gear on said arbor. The opposite end of the member 27 is extended upwardly beyond the contiguous part of the member 9 and is provided with a guide 31 for the slide 29. The clamping screw 28 passes through the members 27 and 9, and serves to firmly secure the member 27 to said member 9. The slide 29 is of any desirable form, size and construction, is movable radially in the guide 31 toward and from the axis of the arbor 22 and the gear thereon to be operated upon, and is provided with a guide 32 which receives the plunger 30. A spring 33 is suitably connected to the plunger 30 for holding the same in its normal position.

When the nut 23 is loosened and the plunger 30 is withdrawn from engagement with the gear 2, said gear may be rotated on its axis a single tooth. After the adjustment of the gear 2, the plunger 30 is released, whereupon the spring 33 causes the inner end of said plunger to enter between two of the teeth of the gear and aline said gear with the tool 1. The nut 23 is then tightened and the machine is in condition for operation upon the gear. The described means for alining the gear 2 relatively to the tool 1 is particularly simple in construction and effective in operation, but my machine is not limited thereto, as any other suitable means may be used for this purpose.

To those skilled in the art, it will be readily understood that the metal-removing means or tool 1, and particularly each cutting edge thereof, is caused to move relatively to the gear support in a path diverging from angularly disposed planes coincident with end and side faces of one or more teeth of the gear, said surfaces meeting at the corner of one or more of the gear teeth being operated upon, and said path intersecting a lengthwise portion of said corner, and that said metal-removing means in the aforesaid movement thereof is caused to engage with a corner portion of one or more of said teeth and to remain out of engagement with the portion of said faces contiguous to such corner portion, and thereby form on the tooth or teeth being operated upon a lengthwise end surface extending substantially in a radial direction at an angle to said end and side faces.

What I claim is:—

1. A machine for beveling the ends of gear teeth comprising means for supporting the gear, metal-removing means movable relatively to said supporting means and means for causing said metal-removing means to move relatively to said supporting means in a path diverging from end and side faces meeting at a corner of the gear tooth being operated upon, and intersecting a lengthwise portion of said corner, and for causing said metal-removing means in the aforesaid movement thereof to engage with the corner portion of said tooth and remain out of engagement with the portions of said faces contiguous to such corner and thereby form on the tooth an end surface extending substantially in a radial direction and at an angle to said end and side faces, substantially as and for the purpose set forth.

2. A machine for beveling the ends of gear teeth comprising means for supporting the gear, metal-removing means revoluble relatively to said supporting means about a fixed axis and means for causing said metal-removing means to move about its axis relatively to said supporting means in a path diverging from end and side faces meeting at a corner of the gear tooth being operated upon, and intersecting a lengthwise portion of said corner for engaging minor portions only of said meeting end and side faces, and for causing said metal removing means to remain out of engagement with major portions of said faces, whereby a surface is provided on the end of the tooth extending substantially in a radial direction and at an angle to said end and side faces, substantially as and for the purpose specified.

3. A machine for beveling the ends of gear teeth comprising means for supporting the gear against rotation during the beveling operation, metal-removing means movable relatively to said supporting means and means for causing said metal-removing means to move relatively to said supporting means in a path diverging from end and side faces meeting at a corner of one gear tooth being operated upon, and also diverging from end and side faces meeting at the opposite corner of a second gear tooth being operated upon, and intersecting a lengthwise portion of each of said corners, and for causing said metal-removing means in the aforesaid movement thereof to engage with the corner portions only of said teeth and remain out of engagement with the portions of said faces contiguous to such corners and thereby provide the two teeth operated upon with end surfaces extending substantially in radial directions and at angles to said end and side faces, substantially as and for the purpose set forth.

4. A machine for forming the ends of gear teeth comprising a support for a gear, rotary cutting means and means for causing said cutting means to move in an arc of a circle inclosing a plurality of teeth of the gear carried by the support and engaging a corner of one of the plurality of teeth and an opposite corner of another of such plurality of teeth and to move out of engagement with contiguous portions of the end and side faces meeting at said corners and thereby form the two engaged teeth with end surfaces extending substantially in a radial direction and at an angle to said end and side faces of said two engaged teeth, substantially as herein specified.

5. A machine for forming the ends of gear teeth comprising a support for a gear, a tool having internal cutting means, and means for causing said cutting means to move in a path diverging from end and side faces meeting at a corner of the tooth being operated upon and intersecting a lengthwise portion of said corner, and to move into engagement with said corner and out of engagement with the portions of said faces contiguous to such corner and thereby form the tooth with an end surface extending substantially in a radial direction and at an angle to said end and side faces, substantially as described.

6. A machine for forming the ends of gear teeth comprising a support for a gear, a tool movable about an axis and having a recess for receiving portions of a plurality of teeth of the gear carried by the support, the tool having internal cutting means, and means for causing the internal cutting means to move in an arc of a circle inclosing said plurality of teeth and engage a corner of one of the plurality of teeth and an opposite corner of another of such plurality of teeth and to move out of engagement with contiguous portions of the end and side faces meeting at said corners and thereby form the two engaged teeth with end surfaces extending substantially in a radial direction and at an angle to said end and side faces of such two engaged teeth, substantially as set forth.

7. A machine for forming the ends of gear teeth comprising a support for a gear, a rotary tool having a recess for receiving portions of a plurality of teeth of the gear carried by the support, the tool having cutting teeth at the margin of the outer end of the recess, and means for causing the cutting edges of the teeth of the tool to move in a path inclosing said plurality of teeth and diverging from end and side faces meeting at one corner of one of said plurality of teeth of the gear and also diverging from end and side faces meeting at the opposite corner of another of such plurality of teeth and intersecting a lengthwise portion of each of said corners, and for causing said cutting to move into engagement with said corners only and out of engagement with the portions of said end and side faces contiguous to such corners and thereby form the two engaged teeth of said plurality of teeth with end surfaces extending substantially in a radial direction and at an angle to said end and side faces of such two engaged teeth, substantially as herein shown and described.

8. A machine for beveling the ends of gear teeth comprising means for supporting the gear, metal-removing means movable about a fixed axis extending in the same general direction as, and at an angle to, the axis of the gear held by the supporting means, and means for causing the metal-removing means to move about such axis relatively to the supporting means in a path diverging from end and side faces meeting at a corner of the gear tooth being operated upon and intersecting a lengthwise portion of said corner and to travel in engagement with said corner, and out of engagement with the portions of said faces contiguous to such corner and thereby form the tooth with an end surface extending substantially in a radial direction and at an angle to said end and side faces, substantially as and for the purpose set forth.

9. A machine for beveling the ends of gear teeth comprising means for supporting the gear against rotation during the beveling operation, metal-removing means movable about an axis extending at an obtuse angle to the plane of the end face of the gear being operated upon, and means for causing the metal-removing means to move about such axis relatively to the supporting means in a path diverging from end and side faces meeting at a corner of the gear tooth being operated upon and intersecting a lengthwise portion of said corner and to travel in engagement with said corner, and out of engagement with the portions of said faces contiguous to such corner and thereby form the tooth with an end surface extending substantially in a radial direction and at an angle to said end and side faces, substantially as and for the purpose described.

10. An apparatus for forming the ends of gear teeth comprising a support for a gear, and means movable about an axis for cutting the ends of the gear teeth, said means having an internal cutter associated therewith and being arranged with its axis extending in the same general direction as the axis of the gear held by the support, substantially as and for the purpose specified.

11. An apparatus for forming the ends of gear teeth comprising a support for a gear, and means movable about an axis for cutting the ends of the gear teeth, said means having an internal cutter associated therewith and being arranged with its axis at an oblique angle to the plane of the end face of the gear being operated on, substantially as and for the purpose set forth.

12. An apparatus for forming the ends of gear teeth comprising a support for a gear, and means movable about an axis for cutting the ends of the gear teeth, said means being arranged with its axis at an angle to the plane of the end face of the gear being operated on, and having a cutting tooth movable in the arc of a circle inclosing a plurality of the teeth of said gear for cutting faces on the ends of two gear teeth at the same operation, substantially as and for the purpose specified.

13. A machine for beveling the ends of gear teeth comprising a support for the gear, a tool rotating about an axis extending at an oblique angle to the plane of the end face of the gear held by the support, the tool having a recess for receiving portions of a plurality of teeth and having cutting edges at the margin of the outer end of the recess, and means for causing said cutting edges to move relatively to the support in a path diverging from end and side faces meeting at one corner of one of said plurality of teeth and also diverging from end and side faces meeting at the opposite corner of another of said plurality of teeth and intersecting a lengthwise portion of each of said corners, and for causing said cutting edges to operate in engagement with said corners only and out of engagement with the portions of said end and side faces contiguous to such corners and thereby form each of the two engaged teeth of said plurality of teeth with an end surface extending substantially in a radial direction and at an angle to said end and side faces thereof, substantially as and for the purpose described.

14. A machine for beveling the ends of gear teeth comprising a support for a gear, a metal-removing edge, and means for causing said metal removing edge to move relatively to the support about an axis disposed at an obtuse angle to the end and peripheral faces of the tooth being operated upon, said metal-removing edge being itself disposed at an angle to the end and side faces of said tooth and at an angle to said axis, substantially as and for the purpose specified.

15. A machine for forming the ends of gear teeth comprising a support for a gear, and a metal-removing edge arranged at an angle to the end and side faces of the tooth being operated upon, the metal-removing edge being out of engagement with said tooth at one end of the gear and engaging such tooth contiguous to the other end of the gear, and means for causing said metal-removing edge to rotate about a fixed axis intersecting the axis of the gear a distance to one side of the last-named end of the gear, substantially as shown and described.

16. A machine for forming the ends of gear teeth comprising a support for a gear, and rotary cutting means movable about an axis in an arc of a circle inclosing a plurality of teeth of the gear carried by the support and engaging at one end of the gear a corner of one of the plurality of teeth and at the same end of the gear an opposite corner of another of such plurality of teeth, said axis intersecting the axis of the gear a distance to one side of said end of the gear, and means for causing said support and cutting means to coöperate to form such two engaged teeth with end surfaces extending substantially in a radial direction and at an angle to end and side faces of said teeth meeting at such engaged corners, substantially as specified.

17. An apparatus for forming the ends of gear teeth comprising two elements, a support for a gear, and means movable about an axis for cutting the ends of the gear teeth, the support being adjustable about an axis toward and from said means, and said means being arranged with its axis at an angle to, and crosswise of, the axis of the support and at an angle to the plane of the end face of the gear carried by the support, and means for moving one of said elements toward and from the other, substantially as and for the purpose set forth.

18. An apparatus for forming the ends of gear teeth comprising two elements, one including a support for a gear, said support comprising a base, a member pivoted to the base, and means for securing the gear to said member, and the other element including a tool movable about an axis and arranged with its axis at an angle to, and crosswise of, the axis of the support, and also at an angle to the axis of the gear and to the plane of the end face of the gear to be operated upon, and means for moving one of the foregoing elements toward and from the other, substantially as and for the purpose specified.

19. An apparatus for forming the ends of gear teeth comprising a support for a gear, said support comprising a base, a member pivoted to the base, and means for securing the gear to said member, a tool movable about an axis and arranged with its axis at an angle to, and crosswise of, the axis of the support, and also at an angle to the axis of the gear and to the plane of the end face of the gear to be operated upon, and means for moving the support toward and from the tool, substantially as and for the purpose described.

20. A machine for forming the ends of gear teeth comprising a supporting member for engaging an end of the gear, an arbor for the gear, the arbor projecting from the supporting member at right angles thereto and being provided with a slot extending transversely therethrough, a yielding part carried by the projecting portion of the arbor and movable into the slot, a bar for engaging the other end of the gear, said bar being passed through the slot and engaged with the yielding part, and means for moving the arbor endwise relatively to the supporting member, substantially as described.

21. In a machine for forming the ends of gear teeth and in combination, a supporting member, a cutting element, means for operating the same, and means for alining the gear to be operated upon on the supporting member and in reference to the cutting element, said means comprising a carrier adjustably mounted on the supporting member, and a member movable in the carrier and in a direction radial to the axis of the gear under treatment and having a part for engaging said gear for alining the same.

22. A machine for forming the ends of gear teeth comprising a supporting member for engaging an end of the gear, clamping means for engaging the opposite end of the gear, a second member movable relatively to the supporting member about an axis substantially coincident with that of the gear on the supporting member, means for holding the second-mentioned member relatively to the supporting member, and means carried by the second-mentioned member and movable relatively thereto substantially radially toward said axis into engagement with teeth of the gear on the supporting member for holding said gear in position to be operated upon, substantially as described.

23. A machine for forming the ends of gear teeth comprising a base, a supporting member for engaging an end of the gear, the supporting member being pivoted to the base on an axis disposed at an angle to an axis substantially coincident with that of the gear on the supporting member, an arbor for the gear, the arbor being carried by the supporting member, clamping means carried by the arbor and engaging the opposite end of the gear, means for moving the arbor axially to actuate the clamping means, a second member movable relatively to the supporting member about an axis substantially coincident with that of the arbor, and provided with a guide extending radially relatively to said axis, means for holding the second-mentioned member relatively to the supporting member, means carried by the second-mentioned member and movable relatively thereto along said guide into engagement with the teeth of the gear on the supporting member for holding said gear in position to be operated upon, and means for holding the supporting member from movement relatively to the base during the operation upon the gear, substantially as and for the purpose set forth.

In testimony whereof, I have hereunto signed my name in the presence of two attesting witnesses, at Syacruse, in the county of Onondaga, in the State of New York, this 7th day of April, 1906.

GEORGE W. SPONABLE.

Witnesses:
S. DAVIS,
B. ARONSON.